March 17, 1925.
E. LUNN
1,529,839
SEPARATOR FOR STORAGE BATTERIES
Filed May 11, 1921
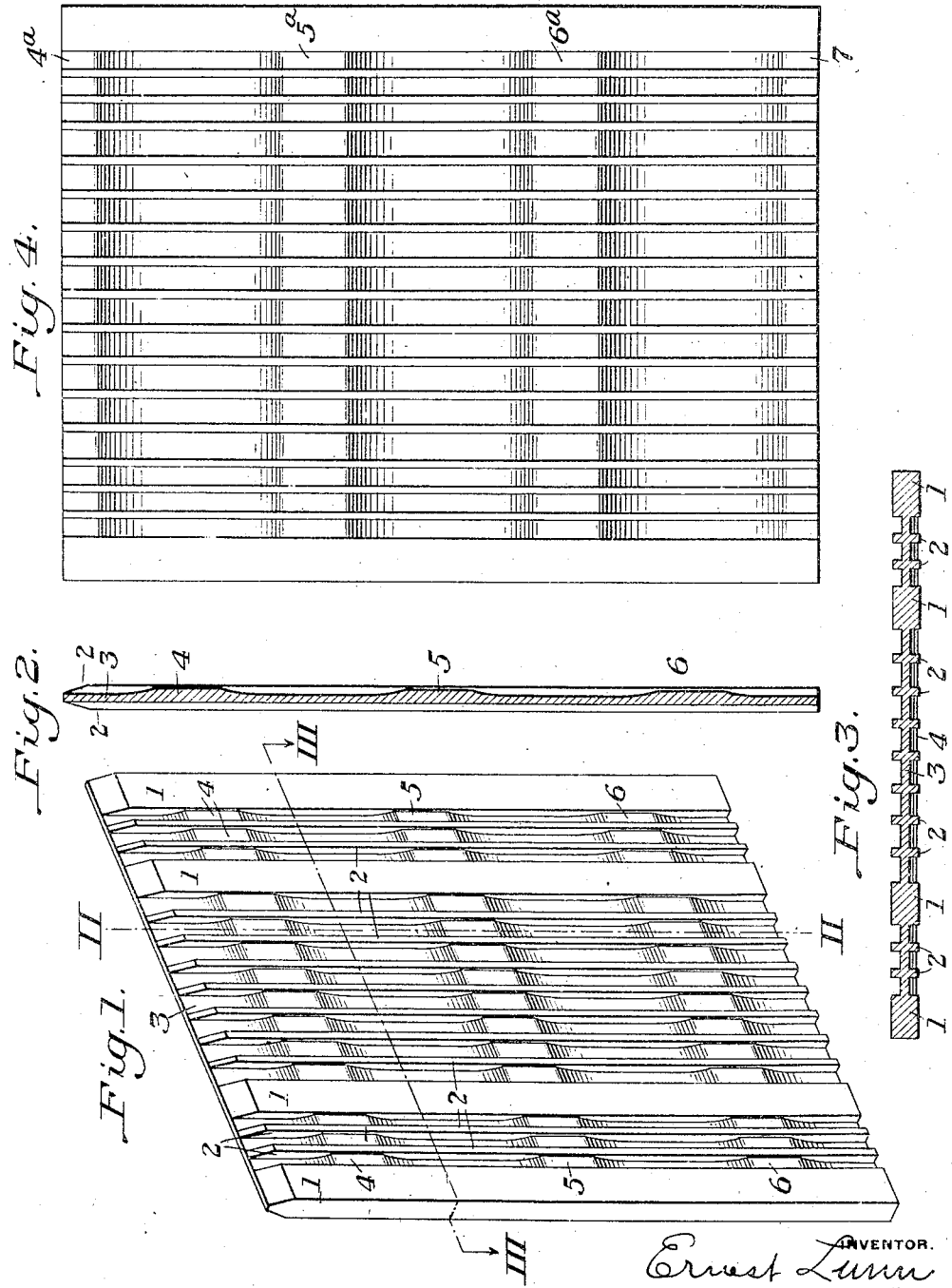

Patented Mar. 17, 1925.

1,529,839

UNITED STATES PATENT OFFICE.

ERNEST LUNN, OF CHICAGO, ILLINOIS, ASSIGNOR TO GOULD STORAGE BATTERY COMPANY, OF NEW YORK, N. Y., A CORPORATION OF NEW YORK.

SEPARATOR FOR STORAGE BATTERIES.

Application filed May 11, 1921. Serial No. 468,783.

To all whom it may concern:

Be it known that I, ERNEST LUNN, a citizen of the United States, residing at Chicago, in the county of Cook and State of Illinois, have invented a new and useful Improvement in Separators for Storage Batteries, of which the following is a full, clear, and exact description.

My invention relates to separators for storage batteries and is particularly applicable to wood separators.

Experience has demonstrated that wood separators are the best to use in batteries, particularly in lead batteries, and especially when the batteries are used in car lighting work as there is less chance that metal short circuits will be formed between positive and negative elements when wood separators are used than when any other kind of separator is employed, such as those made of hard rubber. Wood separators as now furnished are weak and easily broken, especially after they have been in the electrolyte for a few months.

Experience has also shown that the breakage of separators occurs not only during manufacture, shipment and application to the battery, but also while the separators are in service in the battery and most of all while the batteries are being cleaned. The breakage usually occurs along a line parallel to the grain of the wood and invariably through the thin web portion of the separator between the ribs. It is usually necessary to discard a majority of the separators of a battery whenever the battery is dismantled, which occurs at the time the sediment is removed from the cells and the positive and negative groups separated. Dismantling of a battery usually occurs at intervals of eighteen months to two years.

In a sixteen-cell battery there are two hundred twenty-four separators costing approximately twenty cents each. From this it will be apparent that the discarding of a large number of separators each time the battery is cleaned entails a considerable upkeep expense. It is an object of my invention to eliminate this breakage of the separators or at least to reduce it to an insignificant minimum.

A further object is a separator which will be inherently strong enough across the grain to withstand the handling usually received by such separators without breakage even after the separator has been subjected for a considerable period of time to the electrolyte.

A further object of the invention is such a separator as will have the properties above set forth and which can be made economically.

A further object of my invention is a separator which, when placed in position in the battery, will allow free circulation of the electrolyte around the positive plates and ample circulation of the electrolyte and escape of gases formed on the negative plate.

My invention will be better understood by reference to the following description taken in connection with the following drawings, in which—

Figure 1 is a perspective view of a separator embodying my invention;

Figure 2 is a longitudinal sectional view on the line II—II of Figure 1;

Figure 3 is a cross sectional view on the line III—III of Figure 1; and

Figure 4 is a side elevation of a separator embodying a modification of my invention.

In the drawing the separator is provided with spacing members 1, four of which are usually employed. These spacing members extend through the entire thickness of the separator and act to hold the plates against buckling. They also provide additional strength where the separators rest on the plate supporting ribs. Between the spacing members 1 are ribs 2. Between the ribs 2 and between the spacing members and adjacent ribs is a web portion 3. It will be noted that the ribs 2 are provided on both sides of the web so that two of the ribs and the thickness of the web equal the thickness of a spacing member 1. The separator, when placed in the battery, occupies a position similar to that shown in Figures 1, 2 and 4; that is to say, the spacing members 1 and the ribs 2 are vertical.

As ordinarily constructed without my invention, the separators are made so that the web portion 3 is about $\frac{1}{16}''$ thick and the webs 2, as well as the spacing members 1, are about $\frac{11}{32}''$ thick. The ribs 2 are about $\frac{1}{16}''$ wide and the spacing members are about $\frac{3}{4}''$ wide. These measurements vary somewhat and it is to be understood that the figures given above are approximate only. With the separator so far described it will be seen that it will have the strength of a piece of wood approximately 1/16" thick. In fact, the actual strength will be less than that because the presence of the ribs and spacing members adds weight to the separator without adding any strength across the grain so that if the separator is held in a horizontal position by taking hold of one of the outside spacing members, the weight is such that the thin 1/16" web will not be sufficient to support the separator, whereupon the same will in many instances split and the separator will be ruined.

The separator as shown in the drawings is provided with strengthening ribs 4 which extend on a line at right angles to the members 1 and ribs 2. In the separator shown in Figures 1, 2 and 3, there are three of such ribs numbered 4, 5 and 6. These ribs 4, 5 and 6 are preferably provided on one side only of the web, as shown in section in Figures 2 and 3. As shown in Figures 2 and 3, the ribs 4, 5 and 6 terminate at a short distance below the outside edge or top of the ribs 2.

In placing the separators in the battery, the side of the separator having the ribs 4, 5 and 6 thereon, is placed against the negative plate and the side of the separator having only the ribs 2 and spacing members 1 thereon, is placed against the positive plate. By this arrangement, space is provided for acid circulation and also means are provided for the escape of gas thrown off by the negative plate during the charge, thus preventing the formation of air pockets. It is not always necessary to provide means for acid circulation on the negative plate, nor is it necessary in all cases to provide means for the escape of gas thrown off by the negative plate, but in many instances this is a useful expedient. There is nothing to prevent the free circulation of the acid in contact with the positive plate so that the capacity of the battery is not interfered with in any manner.

The separator shown in Figure 4 is similar to that shown in Figures 1, 2 and 3 with the exception that the separator in Figure 4 is provided with strengthening ribs 4ª, 5ª, 6ª and 7, the rib 4ª being at one end of the separator and the rib 7 at the other end, and the spacing members 1 of Figure 1 are omitted. This arrangement provides strength at the ends of the separators and thus aids in the prevention of cracking. The strengthening ribs also perform the function of preventing warping of the plates, in addition to the functions already ascribed thereto. The ribs 4ª and 7 may be made the full thickness of the separators.

My invention when embodied in a separator has many advantages. The separator is greatly increased in strength in the regions where strength is most required; that is, across the grain in the web. By reason of this increased strength the separators may be more expeditiously handled during the original assembly of the battery and, particularly, during the cleaning or repairing of the battery than is possible with a separator not embodying my invention; the circulation of the acid around the positive plate is not in any manner affected; sufficient circulation of the electrolyte around the negative plate is permitted and means is provided for the escape of gas and the prevention of the formation of air pockets around the negative plate; the separators having the above advantages may be manufactured as economically as without such advantages; a separator embodying my invention may be made of wood and does not need to be perforated; separators may be reinstalled in batteries and used over again, thus greatly prolonging the life of the separators. Many other advantages will occur to those skilled in this art and need not be recited herein.

While I have described my invention in great detail, and have shown two illustrative embodiments thereof, I desire it to be understood that I am not limited to the embodiment shown and described as many changes in details may be made therein without departing from the spirit of my invention.

I claim:

1. A separator for storage batteries comprising a single piece of wood having vertical ribs and a rib at substantially right angles to the vertical ribs for strengthening the separator and arranged to provide channels on the opposite sides of the separator which are parallel with each other, substantially as described.

2. A separator for storage batteries comprising a single piece of wood having when in position vertical ribs and horizontal ribs for strengthening the said separator and arranged to provide channels on the opposite sides of the separator which are parallel with each other, substantially as described.

3. A separator for storage batteries comprising a unitary piece of porous material having vertical ribs and a rib at substantially right angles to the vertical ribs for strengthening the separator, said strengthening rib being arranged to provide channels on opposite sides of the separator, substantially as described.

4. A separator for storage batteries comprising a single piece of porous material having ribs on one side and strengthening ribs at substantially right angles to said first ribs, said strengthening ribs being arranged to provide channels on opposite sides of the separator, substantially as described.

5. A separator for storage batteries comprising a piece of wood having ribs on one side parallel with the grain with intermediate thin web portions and ribs on the other side across the grain for strengthening the separator, substantially as described.

6. A separator for storage batteries comprising a piece of wood having spacing portions, ribs between said spacing members and web portions between said ribs and between the ribs and spacing members and strengthening ribs at right angles to said ribs and spacing members, substantially as described.

7. A separator for storage batteries comprising a piece of wood having ribs on both sides extending parallel to the grain of the wood and web portions between said ribs and strengthening ribs on one side extending across the grain of the wood, said strengthening ribs terminating a little short of the top of the ribs on that side of the separator, substantially as described.

8. A separator for storage batteries comprising a fibrous member having ribs thereon adapted to extend vertically when said separator is in position in a battery, web portions between said ribs and strengthening ribs adapted to extend horizontally when said separator is in position in a battery, the tops of said strengthening ribs terminating short of the tops of said ribs, substantially as described.

In testimony whereof, I have hereunto set my hand.

ERNEST LUNN.